(12) United States Patent
Kadhim

(10) Patent No.: US 6,908,375 B1
(45) Date of Patent: Jun. 21, 2005

(54) APPARATUS FOR TENDERIZING AND MARINATING POULTRY AND MEATS

(76) Inventor: Ala J Kadhim, 13524 Quarry Trace, Euless, TX (US) 76040

( * ) Notice: Subject to any disclaimer, the term of this patent is extended or adjusted under 35 U.S.C. 154(b) by 0 days.

(21) Appl. No.: 10/748,623

(22) Filed: Dec. 30, 2003

(51) Int. Cl.[7] .......................... A22C 9/00; A47J 27/00; B65D 77/00
(52) U.S. Cl. ................ 452/144; 206/216; 220/573.1
(58) Field of Search .................. 452/2–11, 102–105, 452/141, 144; 241/262, 268, 270, 273.4, 241/297; 100/219–221, 225, 269.13; 220/573.1

(56) References Cited

U.S. PATENT DOCUMENTS

| | | | |
|---|---|---|---|
| 70,675 A | 11/1867 | Adams | |
| 156,951 A * | 11/1874 | Shults | 452/144 |
| 166,199 A * | 8/1875 | Foster | 452/144 |
| 282,566 A * | 8/1883 | Ramsey | 452/144 |
| 573,660 A | 12/1896 | Hubbell | |
| 715,695 A * | 12/1902 | Robinson | 452/144 |
| 857,568 A * | 6/1907 | Hurley | 452/144 |
| 1,576,164 A | 3/1926 | Wafford | |
| 2,013,801 A * | 9/1935 | Hatch | 452/141 |
| D159,908 S * | 8/1950 | Hulquist | D7/682 |
| 2,720,157 A * | 10/1955 | Harrison | 99/340 |
| 2,791,799 A | 5/1957 | Harrison | |
| 2,850,962 A * | 9/1958 | Beavers | 99/426 |
| 2,990,863 A | 7/1961 | Pantermoller | |
| 3,648,600 A * | 3/1972 | Jaccard | 100/224 |
| 3,772,737 A | 11/1973 | Fleiss | |
| 3,876,812 A * | 4/1975 | Peters | 426/113 |
| 4,037,793 A * | 7/1977 | Puustinen | 241/30 |
| 4,242,774 A | 1/1981 | Massaro | |
| 4,463,476 A | 8/1984 | Jaccard | |
| 6,672,204 B2 * | 1/2004 | Fiorello | 99/495 |

* cited by examiner

Primary Examiner—Thomas Price
(74) Attorney, Agent, or Firm—Michael I. Kroll

(57) ABSTRACT

The present invention 10 discloses a marinating tray 12 with a plurality of vertically extending spikes 14 that allow for the placement of a meat product 16 or the like thereon to provide for an area where perforation and separation of cellular bonds may be accomplished. The present invention 10 has a plurality of spaced apart vertically extending spikes 14 and side walls 18 surrounding the periphery of the bottom tray 20 to allow for the containment of a marinade or seasoning therein and about the vertically extending spikes to produce an improved and penetrating marinating process. The present invention 10 also has a concave area 18 therein. In an alternate embodiment, the present invention 10 may take the shape of a chicken leg.

6 Claims, 8 Drawing Sheets

APPARATUS FOR TENDERIZING AND MARINATING POULTRY AND MEATS

BACKGROUND OF THE INVENTION

1. Field of the Invention

The present invention relates generally to meat tenderizers and, more specifically, to a tenderizing tray having a plurality of conical projections extending upward from a base thereof. The conical projections cause holes to be punctured in the surface of the meat, which aid in the retention of marinades and spices contained in the tenderizing tray.

2. Description of the Prior Art

There are other meat tenderizers designed for tenderizing meats. Typical of these is U.S. Pat. No. 70,675 issued to Adams on Nov. 12, 1967.

Another patent was issued to Foster on Aug. 3, 1875 as U.S. Pat. No. 166,199. Yet another U.S. Pat. No. 573,660 was issued to Hubbell on Dec. 22, 1896 and still yet another was issued on Mar. 9, 1926 to Wafford as U.S. Pat. No. 1,576,164.

Another patent was issued to Harrison on Jun. 14, 1954 as U.S. Pat. No. 2,720,157. Yet another U.S. Pat. No. 2,791,799 was issued to Harrison on May 14, 1957. Another was issued to Pantermoller on Jul. 4, 1961 as U.S. Pat. No. 2,990,863 and still yet another was issued on Nov. 20, 1973 to Fleiss as U.S. Pat. No. 3,772,737.

Another patent was issued to Massaro on Jan. 6, 1981 as U.S. Pat. No. 4,242,774. Yet another U.S. Pat. No. 4,463,476 was issued to Jaccard on Aug. 7, 1984. Another was issued to Pope on Dec. 28, 2001 as Canadian Patent No. 2,351,282 and still yet another was issued on Mar. 17, 1976 to Hollymatic Corporation as U.K. Patent No. 1,428,080.

U.S. Pat. No. 70,675 Inventor: Anson T. Adams
Issued: Nov. 12, 1967

The combination of the two jaws with the plates 11, bars m nz, and springs n n, all arranged and operating as and for the purpose specified. Said device consists of two "plates or jaws, represented respectively by A B C and D E F, held, together as follows: The plate I I is provided at I I with a round hole, and at 0 with a cylindrical pin, projecting into a corresponding hole in the upper jaw A B C, at 0, so that the said jaw, A B C, will be free to move around it. The hole I of said plate I I is then put over the upright bar m m. Over the said m, on the top of the horizontal part of said plate I I, is placed the spiral spring n n, and finally the nut L, screwed on the top of the said m, the whole, when in its proper position, being as represented by the accompanying drawings, and there designated by the appropriate letters. These two jaws, A B C and D E F, have each one serrated side, as represented in said drawings, the teeth of A B C, the upper jaw, being about twice as long as the teeth of the lower jaw D E F. The teeth of both jaws are to be otherwise of the same pitch; so that they will fall into each other when closed. The upper jaw, A B C, is provided with a convenient handle, H, and the under jaw, D E F, with suitable screwholds, represented by S.

U.S. Pat. No. 166,999 Inventor: A. G. W. Foster
Issued: Aug. 3, 1875

The invention relates to an improvement in meat-tenderers; and consists in making in the bed-plate a series of conical holes, into which similarly-shaped projections on the under side of the lever enter, the said projections being sharp-pointed, and of such a size as to leave a space all around them when pressed down into the holes. The bed-plate a, has; the conical recesses b and sharp-cutting edges c, with the lever provided with the sharp projections e, the projections being enough smaller than the recesses b to leave a space all around them.

U.S. Pat. No. 573,660 Inventor: H. C. Hubbell
Issued: Dec. 22, 1896

The invention consists in rigidly connecting an upper plate to its operating handle and hinging it to a lower stationary plate, the said plates having secured to them suitable pyramidal cutting-teeth having vertical concavities in their faces and secured to the inner side of each of said plates.

U.S. Pat. No. 1,576,164 Inventor: J. C. Wafford
Issued: Mar. 9, 1926

A meat tenderer comprising a pair of pivotally connected plate members, one plate member having, inwardly projecting teeth, the plate member having the teeth being provided with a combined round bone and T-bone receiving opening.

U.S. Pat. No. 2,720,157 Inventor: Taylor Harrison
Issued: Jun. 14, 1954

A meat tenderizer-cooking device comprising a base, an electrical heating element in said base, a cover pivoted at one end to said base, a grid plate on said base, a plurality of pointed projections extending upwardly from said grid plate, and a plurality of thin, elongated cutting blades extending downwardly from said cover, said cutting blades being arranged in a series of rows wherein the blades of each row are longitudinally offset from the blades of the rows adjacent thereto.

U.S. Pat. No. 2,791,799 Inventor: Taylor Harrison
Issued: May 14, 1957

In a meat tenderizer, the combination which comprises a first jaw having meat engaging teeth on a surface thereof, a handle extended from one end and a hub with spaced transversely disposed slots extended therethrough on the end opposite to that from which the handle extends, a second jaw also having meat engaging teeth on one side, a handle extended from one end and a hub with spaced transversely disposed slots extended therethrough on the end opposite to that from which the handle extends, the transversely disposed slots of the hub of the second jaw being positioned in registering relation with the transversely disposed slots of the hub of the first jaw, parallel bars positioned at the ends of the hubs of the jaws and in the slots extended through the hubs, pins extended through the bars and hubs for pivotally mounting the jaws on the bars, one end of the hub of the first jaw having openings extended inwardly and said openings being positioned, on opposite sides of the pin extended through the bars and hub, and spring actuated balls positioned in said openings, the inner face of the bar positioned against the end of the hub in which the openings are positioned having recesses therein positioned to receive the spring actuated balls, said handles having lugs thereon to limit closing movements of the teeth of the jaws.

U.S. Pat. No. 2,990,863 Inventor: Carl Pantermoller Issued: Jul. 4, 1961

An apparatus for removing the chalaza from an egg, comprising a pair of arms connected together, and a pair of cooperated jaws connected to the arms and offset from said plane, each jaw having a clipping member extending laterally of said plane and disposed to cooperate with the clipping member of the other jaw to snip the chalaza and each jaw having a generally roughened surface disposed adjacent said clipping member and disposed to cooperate with the roughened surface of the other jaw to hold the chalaza after the same has been snipped, said roughened surfaces being spaced from each other when the jaws are in the closed position to provide a clearance therebetween to receive the snipped chalaza and prevent the same from being mashed.

U.S. Pat. No. 3,772,737 Inventor: Victor P. Fleiss Issued: Nov. 20, 1973 manually grippable and actuatable portable type meat tenderizer characterized, generally stated, by two units is disclosed. One unit constitutes a handling and tenderizing unit and is structurally designed to be held in and operated by one hand. The complemental unit is an adapter for the first-named unit. The first-named unit embodies a handle having a lower end provided with a pounding head equipped with meat penetrating and cutting elements or tines. The adapter unit has guide means for the handle and head and, in addition, an apertured plate which functions as a stripper for the extensible and retractable tines.

U.S. Pat. No. 4,242,774 Inventor: Margaret F. Massaro Issued: Jan. 6, 1981

Disclosed is a meat tenderer for use by a housewife that includes a support plate having a handle attached to the top surface thereof and a series of thin blades secured to the bottom surface, each blade having a series of triangular-shaped teeth positioned along its length with every other tooth in the series being shorter than the next adjacent tooth.

U.S. Pat. No. 4,463,476 Inventor: Andre R. Jaccard Issued: Aug. 7, 1984

An improved hand operated meat tenderizer is disclosed which is easier to use and to keep clean than those of the prior art.

Canadian Patent Number 2,351,280 Inventor: Pope Richard D. Issued: Dec. 28, 2001

The present invention provides a needle for injecting substances into food products, and a method of making such needles, such devices comprising a generally tubular body having a pointed end and a second end, an axil duct in the tubular body, openings located on the tubular body near the first and second ends, and an insert located in the axil duct between the second end of the tubular body and the opening located near the second. End of the tubular body, whereby material is prevented from being deposited in the axil duct between the second end of the tubular body and the opening located near the second end of the tubular body.

U.K. Patent Number 1,428,080 Inventor: Hollymatic Corporation Issued: Mar. 17, 1976

A yieldable-knife meat-tenderizing apparatus particularly for meat that contains bones, comprising: a plurality of closely spaced, sets of elongated knives, each knife having a sharp meat penetrating and meat serving sloped end, each said set comprising a recprocable piston and a plurality of said knives on the piston with the knives in each set being substantially parallel to each other and to their said piston and the meat penetrating ends of the knives of each set being adjacent to but separate from each other; and force yieldable means independently operable in each piston to yieldably urge each said set of elongated knives towards a meat penetrating position.

While these meat tenderizers may be suitable for the purposes for which they were designed, they would not be as suitable for the purposes of the present invention, as hereinafter described.

SUMMARY OF THE PRESENT INVENTION

The present invention discloses a marinating tray with a plurality of vertically extending spikes that allow for the placement of a meat product or the like thereon to provide for an area where perforation and separation of cellular bonds may be accomplished. The present invention has a plurality of spaced apart vertically extending spikes and side walls surrounding the periphery of the bottom tray to allow for the containment of a marinade or seasoning therein and about the vertically extending spikes to produce an improved and penetrating marinating process. The present invention also has a concave area therein. In an alternate embodiment, the present invention may take the shape of a chicken leg.

A primary object of the present invention is to provide a tenderizing tray that can overcome the shortcomings of the prior art.

Another object of the present invention is to provide a tenderizing tray having a base enclosed by sidewalls extending from a periphery of the base and hinged top cover.

Yet another object of the present invention is to provide a tenderizing tray having a plurality of upwardly projecting conical tines extending from the base and surrounded by the side walls for perforating a meat product when placed thereon.

Still yet another object of the present invention is to provide a tenderizing tray for wicking the marinade deeply into the meat.

Another object of the present invention is to provide a tenderizing tray that allows the marinade to move freely under the meat during the marinating process.

Yet another object of the present invention is to provide a tenderizing tray having a hinged cover with vertically extending spikes thereon.

Still yet another object of the present invention is to provide a tenderizing tray that will more effectively allow the penetration of the marinade into the meat product used therewith.

Additional objects of the present invention will appear as the description proceeds.

The present invention overcomes the shortcomings of the prior art by providing a marinating tray with a plurality of vertically extending spikes that allow for the placement of a meat product or the like thereon to provide for an area where perforation and separation of cellular bonds may be accomplished on the lower contacting surface of the product that also allows for the greater absorption of a marinade or seasoning further producing a tenderizing effect during a tenderizing process to said product while placed within the present invention.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
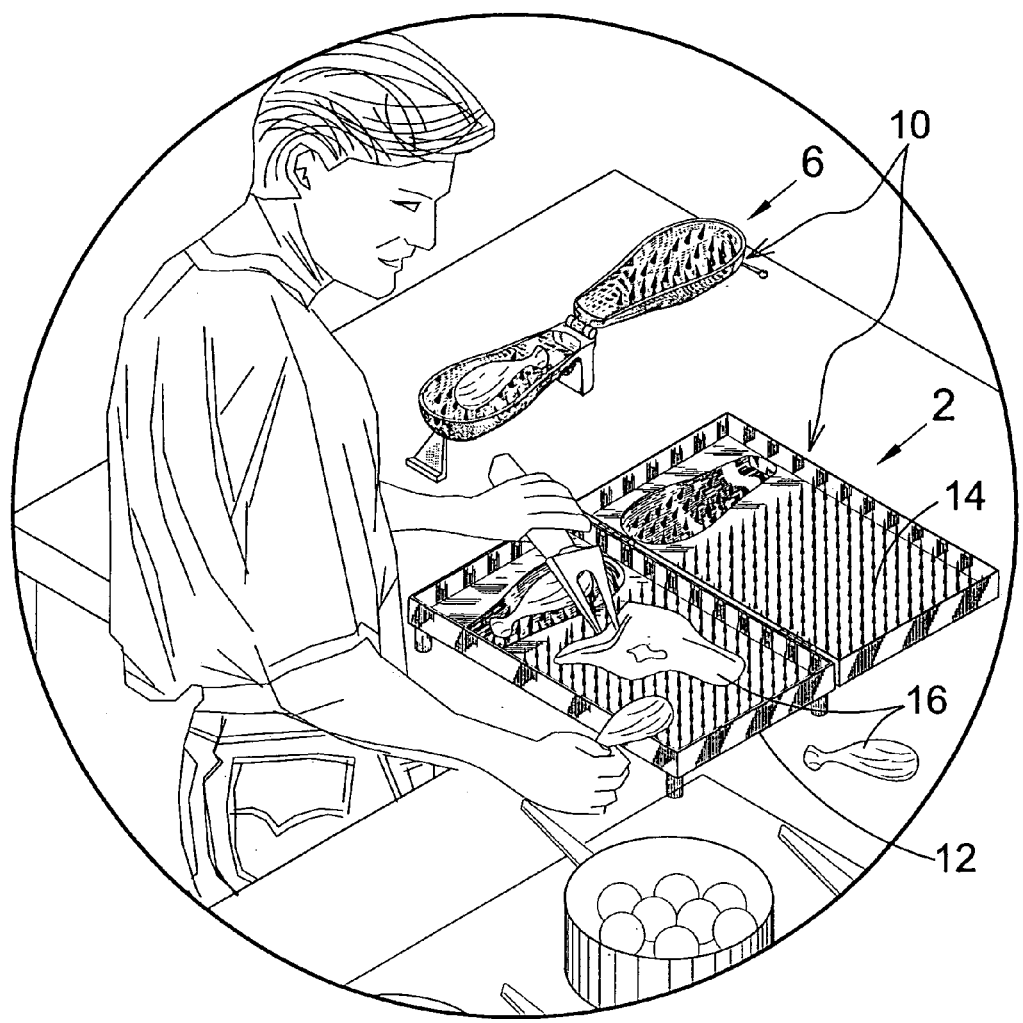
FIG. 1 is an illustrative view of the present invention in use.

With regard to reference numerals used, the following numbering is used throughout the drawings.

10 present invention
12 tray
14 spikes
16 meat
18 sidewalls
20 base
22 top cover
24 hinge
26 legs
28 concave area
30 handle.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is the present invention 10 having the form of a marinating tray 12 with a plurality of vertically extending spikes 14 that allow for the placement of a meat product 16 or the like thereon to provide for an area where perforation and separation of cellular bonds may be accomplished on the lower contacting surface of the product that also allows for the greater absorption of a marinade or seasoning further producing a tenderizing effect during a tenderizing process to the product while placed within the present invention.

Figure 2:
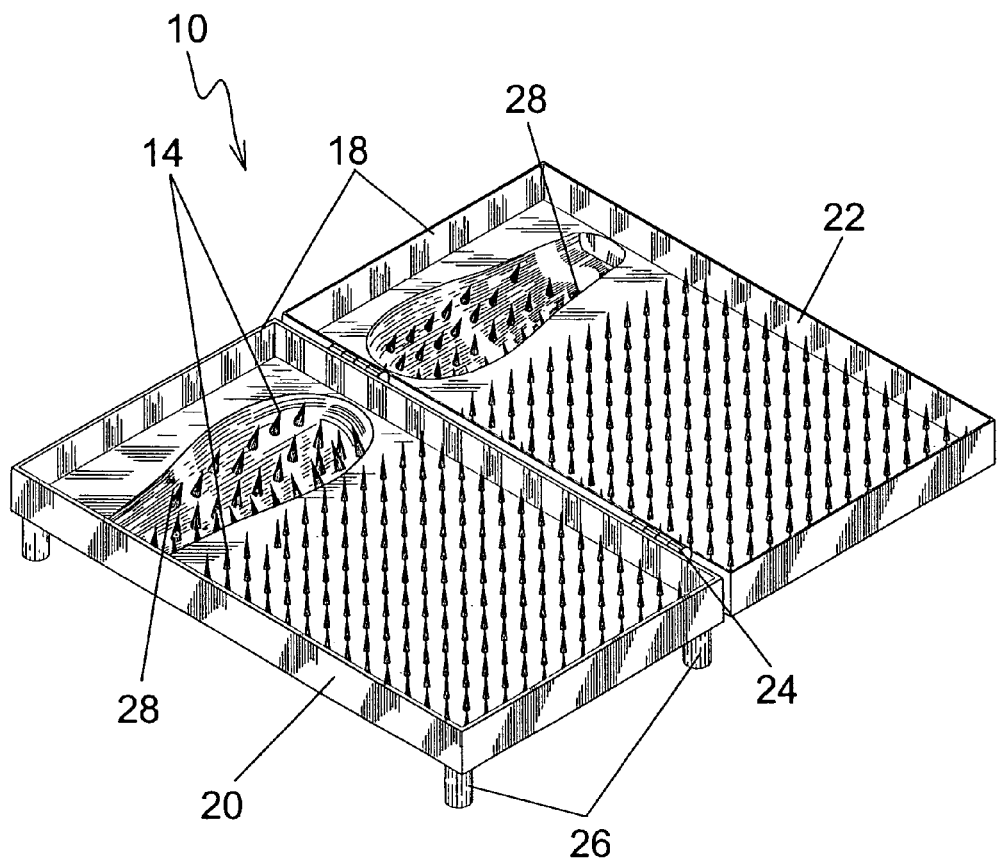
FIG. 2 is a perspective view of the present invention.

Turning to FIG. 2, shown therein is a perspective view of the present invention 10. Shown is the present invention 10 having a plurality of spaced apart vertically extending spikes 14 and side walls 18 surrounding the periphery of the base or bottom tray 20 to allow for the containment of a marinade or seasoning therein and about the vertically extending spikes to produce an improved and penetrating marinating process. Also shown are top cover 22, hinge 24, legs 26, and concave area 28 in the shape of a chicken leg.

Figure 3:
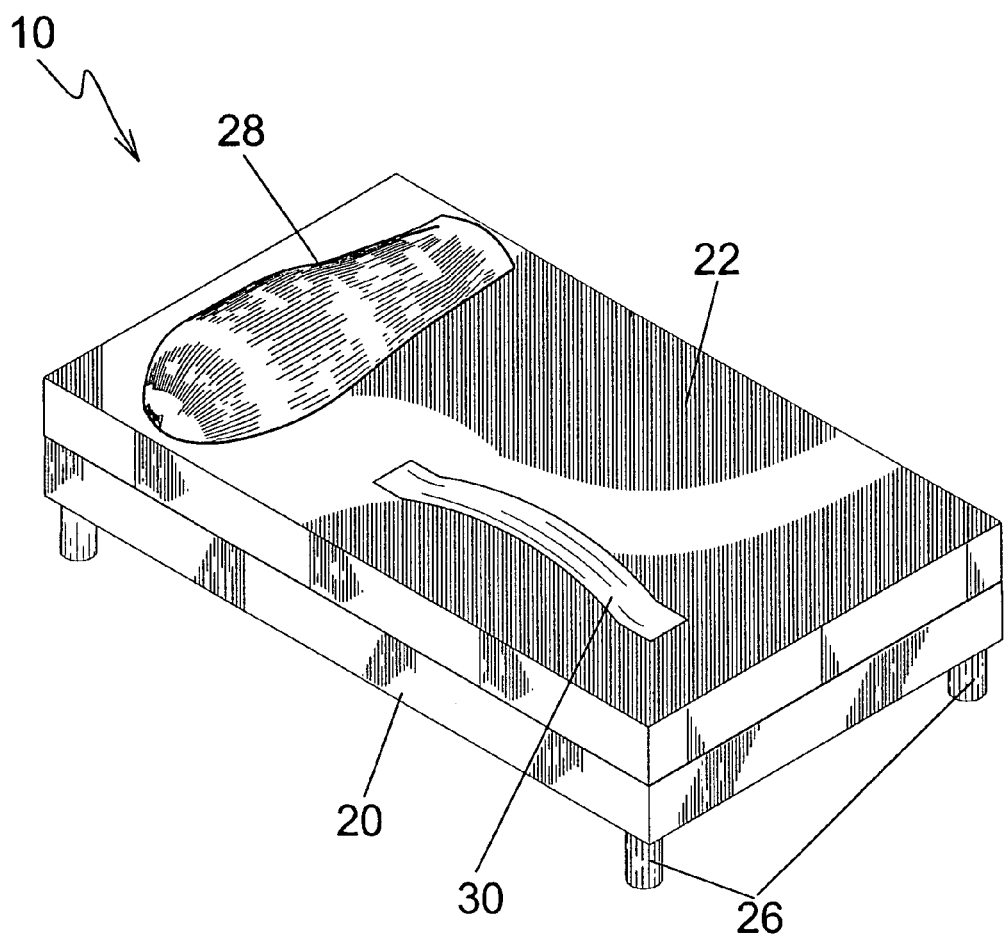
FIG. 3 is a perspective view of the present invention.

Turning to FIG. 3, shown therein is a perspective view of the present invention 10. Shown is a meat tenderizer having a plurality of vertically extending spikes within and a hinged cover 22 having a handle 30 extending therefrom. The bottom concave tray 20 has an additional concave area 28 base angularity extending therefrom with another additional base on the opposing end extending vertically downward to further stabilize the unsymmetrical shape of the additional element of the present invention. Also shown are legs 26 and aperture 32.

Figure 4:
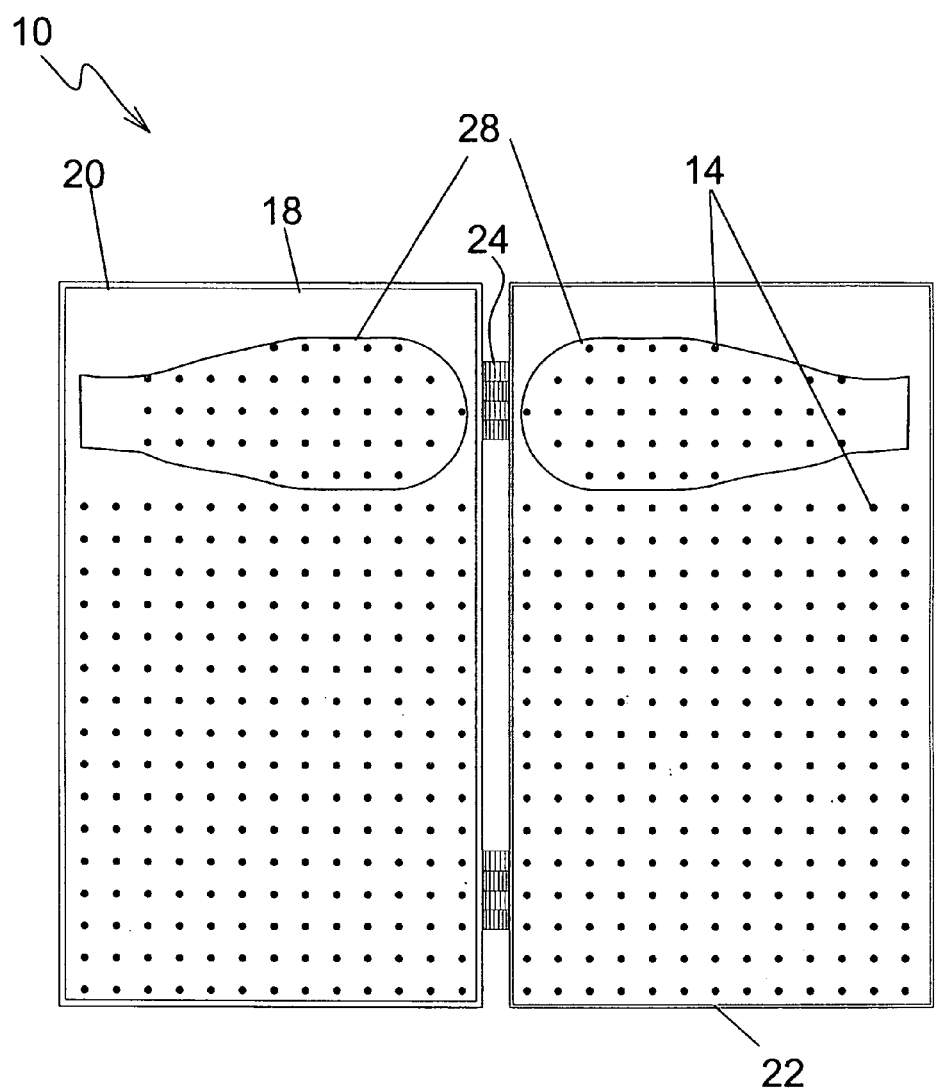
FIG. 4 is a top view of the present invention.

Turning to FIG. 4, shown therein is a top view of the present invention 10. Shown is a meat tenderizer having a base 20 with a cover 22 hinged at 24 with a handle extending therefrom. The bottom tray 20 has a concave area 28 tray has an additional base angularity extending therefrom with another additional base on the opposing end extending vertically downward to further stabilize the unsymmetrical shape of the additional element of the present invention. Also shown are the spikes 14 and sidewalls 18.

Figure 5:
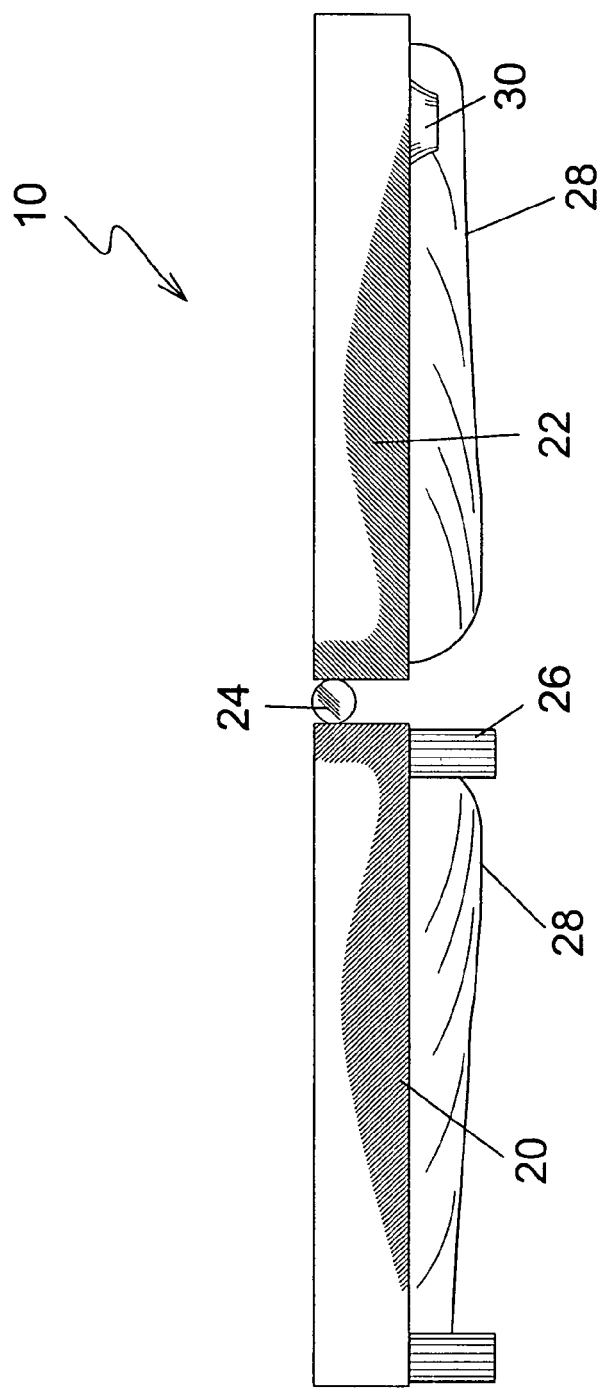
FIG. 5 is a side view of the present invention.

Turning to FIG. 5, shown therein is a side view of the present invention 10. Shown is a meat tenderizer having a base 20 with a cover 22 and hinge with a handle 30 extending therefrom. The bottom tray 20 has a concave area 28 tray has an additional base angularity extending therefrom with another additional base on the opposing end extending vertically downward to further stabilize the unsymmetrical shape of the additional element of the present invention. Also shown are legs 26.

Figure 6:
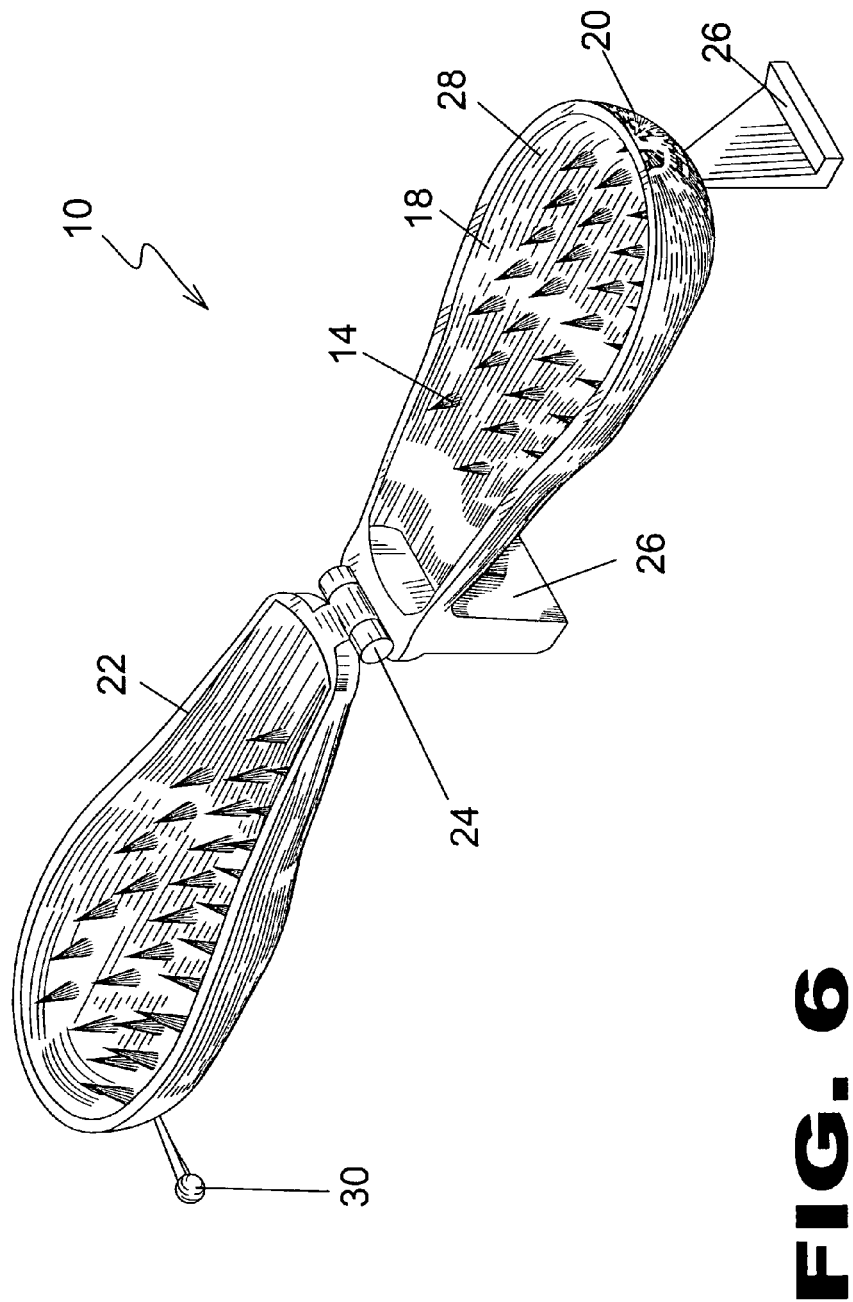
FIG. 6 is a perspective view of an additional element of the present invention.

Turning to FIG. 6, shown therein is a perspective view of the additional element of the present invention 10 in use. Shown is the present invention 10 having a plurality of spaced apart vertically extending spikes 14 that are used for the tenderizing of a meat product or the like and side walls 18 surrounding the periphery of the tray to form a concave area 28 to allow for the containment of a marinade or seasoning therein and about the vertically extending spikes to produce an improved and penetrating marinating process. Shown are the base 20, support legs 26, top cover 22, hinge 24 and handle 30.

Figure 7:
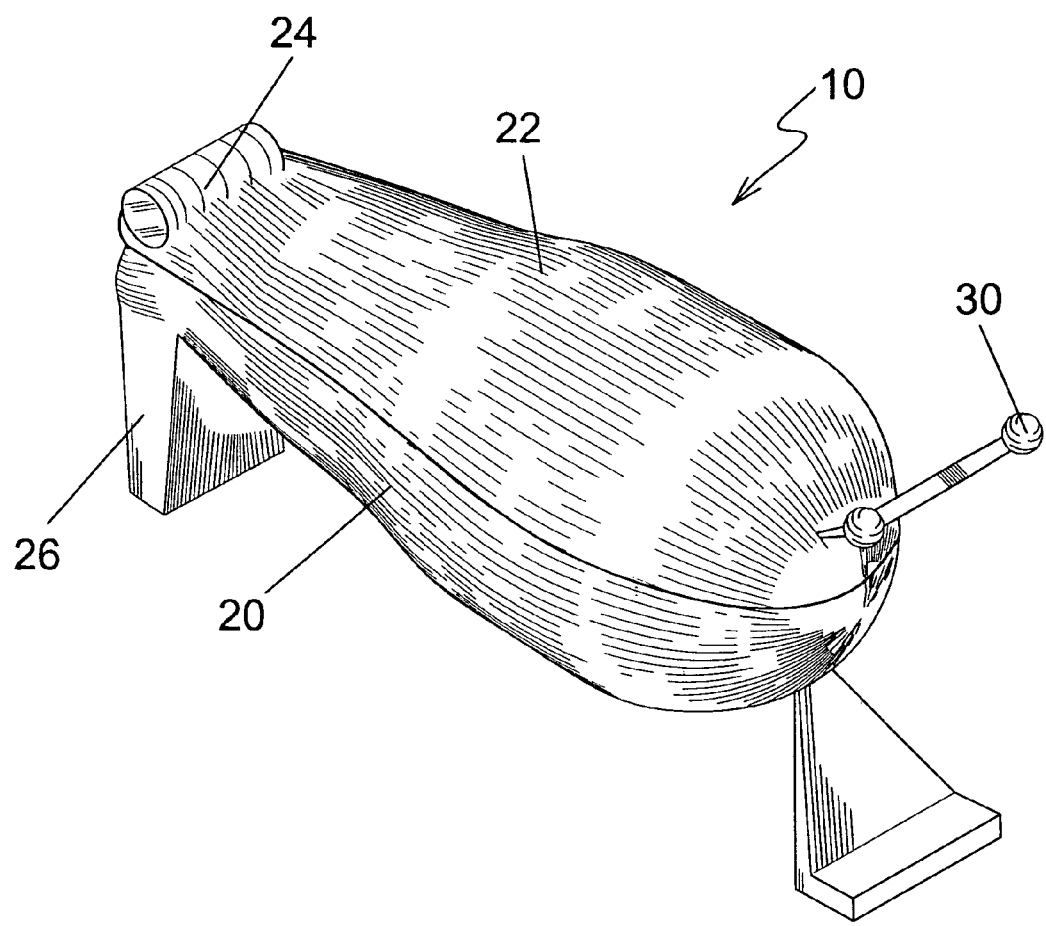
FIG. 7 is a perspective view of an additional element of the present invention.

Turning to FIG. 7, shown therein is a perspective view of the additional element of the present invention 10. Shown is the present invention 10 comprised of a rigid material having a plurality of spaced apart vertically extending spikes and a base 20 with cover 22 and hinge 24 also having means for opening and closing with the spike members thereon and a raised concave partition on the surface. A downward extrusion within the bottom member extends the height of the area within the chamber for cooking larger meat products. Shown are leg 26 and handle 30.

Figure 8:
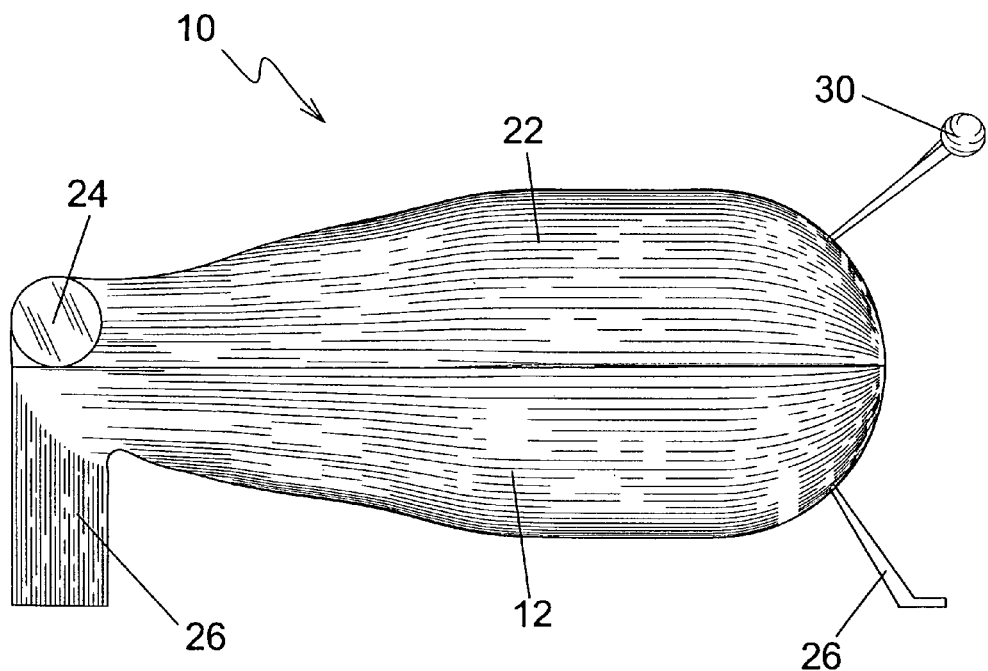
FIG. 8 is a side view of an additional element of the present invention.

Turning to FIG. 8, shown therein is a side view of the additional element of the present invention 10. Shown is the present invention 10 having a plurality of spaced apart vertically extending spikes and side walls surrounding the periphery of the bottom tray 12 to allow for the containment of a marinade or seasoning therein and about the vertically extending spikes to produce an improved and penetrating marinating process. Shown are front and rear legs 26, top cover 22, hinge 24 and handle 30.

I claim:

1. A marinating tray for meat food products, comprising:
   a) a base tray, said base tray being triangular shaped having a pair of longer opposite sides and a pair of shorter opposite sides, a bottom having an underside, and upwardly extending sidewalls on each said side to permit fluid to be contained therein;
   b) a plurality of upwardly extending spikes being disposed on said bottom in a spaced apart relationship to permit the spikes to penetrate a food product placed in the marinating tray;
   c) a cover being complementarily shaped as said base tray so as to fit on top of said base tray, said cover being defined by a top having an upper side, and downwardly extending sidewalls on each said side, wherein said sidewalls are disposed downwardly when said cover is disposed on top of said base tray, wherein said downwardly extending sidewalls of said cover mate with said upwardly extending sidewalls of said base tray when said cover is disposed on top of said base tray to permit fluid to be contained therein;
   d) a plurality of downwardly extending spikes being disposed on said top of said cover in a spaced apart relationship to permit the spikes to penetrate a food product placed in the marinating tray; and,
   e) a plurality of hinges being disposed on adjacent sides of said base tray and said cover to permit the base tray and the cover to be moved to a closed position and thereafter moved to an open position.

2. The marinating tray of claim 1, further comprising a plurality of legs being disposed on said underside of said bottom to permit the tray to be supported by legs.

3. The marinating tray of claim 1, wherein said concave portion of said base tray is disposed parallel to and adjacent to one of said shorter sides of said base tray.

4. The marinating tray of claim 1, wherein said concave portion of said cover is disposed parallel to and adjacent to one of said shorter sides of said cover.

5. The marinating tray of claim 1, wherein said concave portions of said base tray and said cover are disposed in operable alignment so that one is a mirror image of the other so as to cooperate with each other.

6. The marinating tray of claim 1, further comprising a handle being disposed on said upper side of said cover to permit the marinating tray to be carried about by a user.

* * * * *